United States Patent [19]

Lamy et al.

[11] 4,416,473
[45] Nov. 22, 1983

[54] FLEXIBLE JOINT FOR CONNECTION OF TWO PIPES

[75] Inventors: Jacques E. Lamy, Fontenay-aux-Roses; Dominique Michel, Paris; Francisco D. M. Serrano, Issy-les-Moulineaux, all of France

[73] Assignee: Compagnie Generale pour les Developpements Operationnels des Richesses Sous-Marines "C. G. Doris", Paris, France

[21] Appl. No.: 275,394

[22] Filed: Jun. 19, 1981

[30] Foreign Application Priority Data

Jul. 11, 1980 [FR] France ................................ 80 15454

[51] Int. Cl.³ ............................................. F16L 27/10
[52] U.S. Cl. ........................................ 285/41; 285/55; 285/223; 285/263; 285/363
[58] Field of Search ............... 285/223, 263, 235, 363, 285/41, 55

[56] References Cited

U.S. PATENT DOCUMENTS

| 4,068,868 | 1/1978 | Ohrt ................................. 285/223 X |
| 4,071,269 | 1/1978 | Halling et al. ................... 285/263 X |
| 4,183,556 | 1/1980 | Schwemmer .................... 285/263 X |
| 4,236,738 | 12/1980 | Poot ..................................... 285/263 |

FOREIGN PATENT DOCUMENTS

| 2072343 | 9/1971 | France . |
| 2389063 | 11/1978 | France . |
| 1189052 | 4/1970 | United Kingdom . |

*Primary Examiner*—Dave W. Arola
*Attorney, Agent, or Firm*—Wigman & Cohen

[57] ABSTRACT

A flexible joint for connection of two pipes comprises a cup-shaped piece which can be connected to a first pipe, a tubular piece which can be connected to a second pipe, the tubular piece being coaxial with the cuplike piece and being arranged partially inside it, and two flexible spherical rings arranged between the cuplike piece and the tubular piece. The two flexible spherical rings are bolted together and arranged on opposite sides of the center of oscillation, the concave surfaces of the rings being directed towards the center of oscillation and being concentric with respect to this center.

8 Claims, 2 Drawing Figures

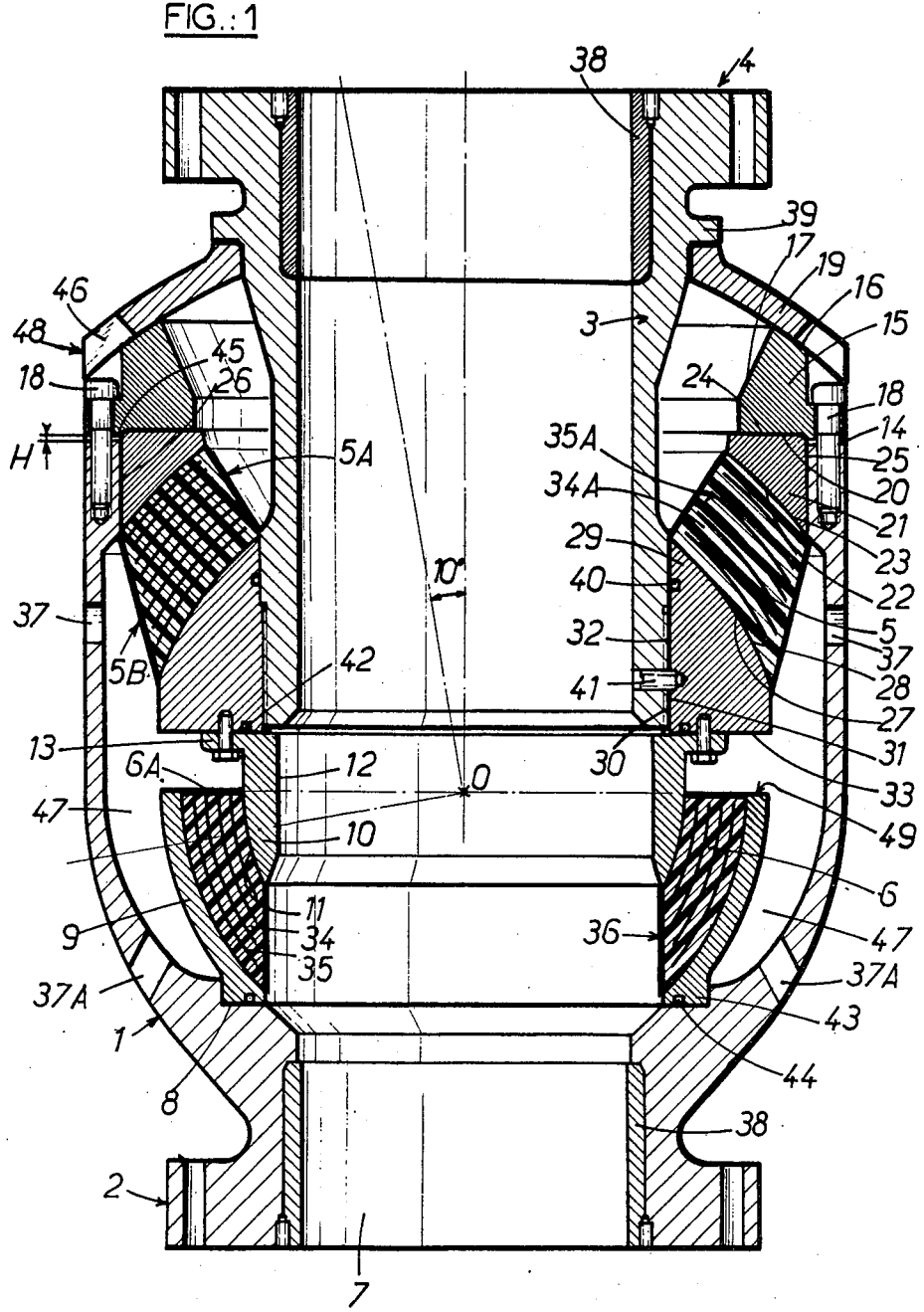

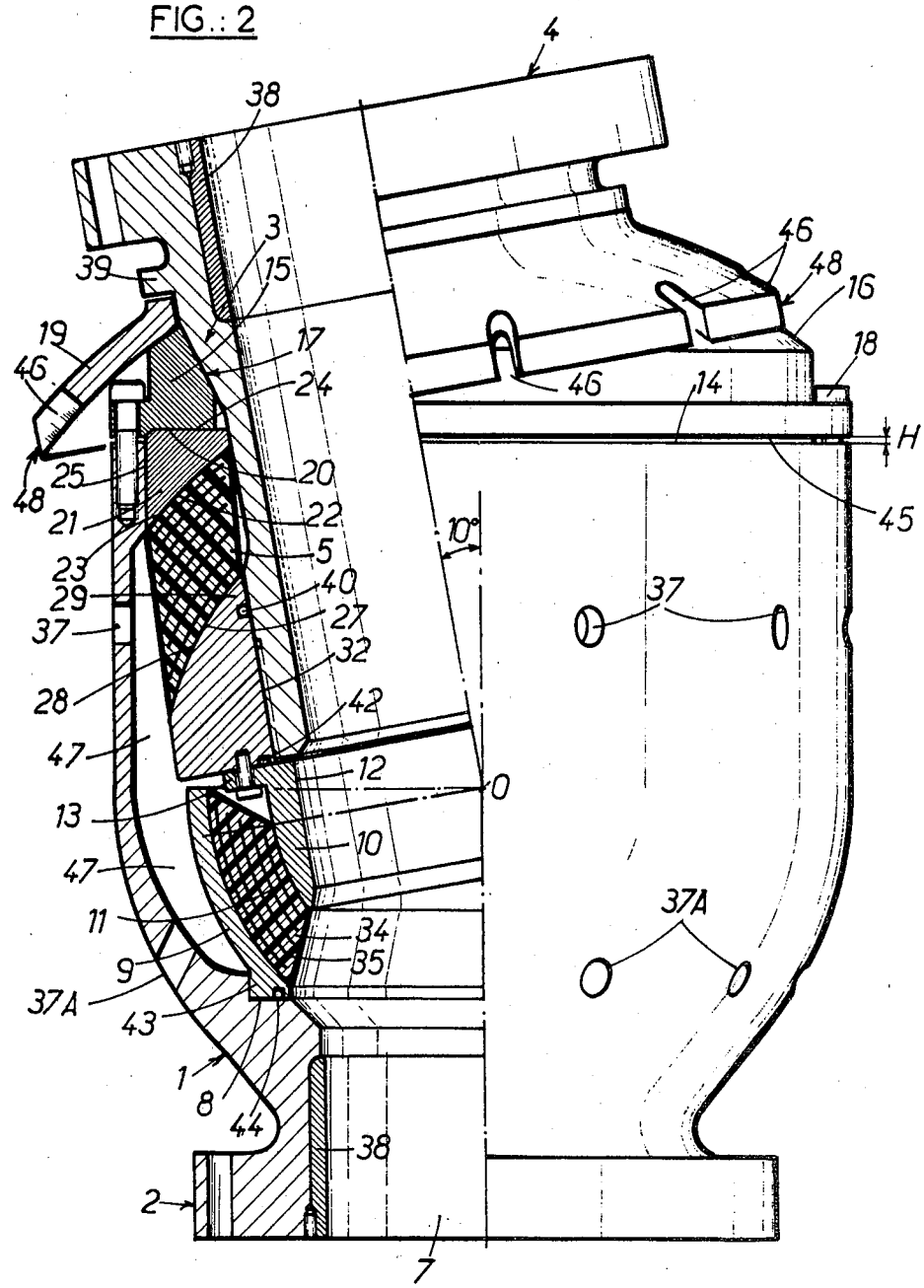
FIG.: 2

FLEXIBLE JOINT FOR CONNECTION OF TWO PIPES

BACKGROUND OF THE INVENTION

1. Field of the Invention

The invention refers to a flexible joint for connection of two pipes, the flexible joint including a cup-shaped piece connected to one pipe, a tubular piece connected to the second pipe, coaxial with the cuplike piece and arranged partly inside it, and two flexible spherical rings arranged between the cuplike piece and the tubular piece.

2. Description of the Prior Art

In drilling oilwells at sea, an extension tube called a "riser" is placed between the blow out preventer of the wellhead on the sea bottom and the drilling installation on the surface as, for instance, a drilling platform or ship. Through this riser tube passes the drilling string and the drilling mud rises through it. Consequently, the riser must have a sufficiently large diameter for enabling the drill bit and the various devices employed in drilling to pass through, and a thickness capable of withstanding pressures which may reach several hundred bars. These imperatives lead to the employment of a tube of great rigidity. When drilling is conducted from a floating platform or a ship, the "riser" tube must be able to follow the movements without undergoing serious stresses. The vertical movements of the drilling platform are compensated by a suspension device of the "riser" tube which keeps the latter under near constant tension in order to avoid any risk of buckling. The horizontal movements of the floating support take along the tube which sweeps a conical volume the angle of which depends upon the accuracy of the positioning. Generally, the tube is equipped in its lower portion with a flexible joint which allows its oscillation and withstands the tension caused by the suspension device. The exploitation of movable platforms, drilling ships and oscillating platforms, has enabled it to be found that, although a device for suspension of the riser tube may be provided, compressive forces occur which are carried by the flexible joint and cause it to be put out of action prematurely.

Numerous patents have attempted to solve the multiple and often contradictory problems which are posed by the employment of flexible joints.

Thus, the French Patent No. 2 389 063 describes a flexible joint system which includes a system of distributing the difference between the outer and inner pressures, the inner pressure being approximately twice the outer. This joint comprises a cup-shaped piece connected to the lower pipe and a tubular piece connected to the upper pipe. This piece is arranged coaxially and partly in the cup-shaped piece where it is held by a double system of flexible spherical rings. The rings consist of an elastic body interposed between two end-pieces, an inner one and an outer one, the spherical profiles of which are defined by arcs of circles having the same center or the centers of which are offset along the geometrical axis. The elastic bodies are formed of alternate layers of elastomer and an inextensible material, the thicknesses of which are constant or decreasing. The concave portions of the rings are arranged at one and the same side with respect to the center of rotation of the joint. One of the rings is fixed between a flange, which closes the opening in the cuplike piece, and the tubular piece and this ring works under compression in response to tensile forces. The second ring, fixed between the tubular piece and the bottom of the cuplike piece, likewise works in compression in response to tensile forces but the essential aim of it is to ensure sealing between the inside of the joint and the ambient medium. The volume lying between the seals and the inside of the cup is filled with an incompressible fluid which transmits the pressure between the rings and makes them act in series in order to distribute the difference between the internal pressure and the external ambient pressure. The outer ring likewise works as an emergency seal in case of failure of the inner sealing ring.

The French Patent No. 2 389 064 describes a similar flexible joint in which the two rings are arranged between the flange which closes the cuplike piece, and the end of the tubular piece. The tubular piece exhibits at the lower portion of it a spherical collar which cooperates with a spherical portion provided at the bottom of the cuplike piece in order to form a ball joint. This arrangement enables all of the forces of compression to be withstood, while there is a risk of tensile forces disengaging the parts of the ball joint. The flexible rings are arranged on opposite sides of the center of rotation and the centers of the arcs of circles which define the spherical profiles are located on opposite sides of the center of rotation on the geometrical axis.

These joints exhibit a certain number of disadvantages amongst which are:

the relative smallness of the angle of swing due either to the mechanical limitation of the travels by the opening in the flange or by the position of the center of rotation, or to lack of mobility due to the internal pressure;

the bulk: the outer diameter of the joint is large with respect to the useful diameter of passage;

limited working life due to the wear of the pieces in contact with the abrasive or corrosive products being conveyed;

the difficulty of erecting and dismantling such joints.

The French Patent No. 2 327 982 solves the problem of the swing by associating two joints of a type similar to that of the French Patent No. 2 389 063 but the device loses by this solution its simplicity and compactness.

The problem of bulk does not seem to have found any solution in spite of the interest which there is in reducing the areas subjected to pressure and the costs of manufacture.

SUMMARY OF THE INVENTION

The flexible joint in accordance with the invention enables a large angle of swing or oscillation ($\pm 10°$) to be obtained for a reduced bulk which may be measured by the ratio between the overall outside diameter of the joint and the useful internal diameter of the passage connecting the two pipes.

The flexible joint which is the object of the application includes a cup-shaped piece which can be connected to a first pipe, a tubular piece which can be connected to a second pipe, the tubular piece being coaxial with the cuplike piece and being arranged partly inside it, and two flexible spherical rings arranged between the cuplike piece and the tubular piece. The two flexible spherical rings are arranged on opposite sides of the center of oscillation, the concave surfaces of the rings being directed towards the center of oscillation and being concentric with respect to this center.

BRIEF DESCRIPTION OF THE DRAWINGS

The explanations and the figures given below by way of example will enable it to be understood how the invention may be realized.

FIG. 1 represents in section a view of the flexible joint in accordance with the invention.

FIG. 2 is a view half in section, of the same joint deflected.

DETAILED DESCRIPTION OF THE PREFERRED EMBODIMENT

FIG. 1 shows a flexible joint made in accordance with the invention for the connection of two pipes. The joint includes a cup-shaped piece 1 capable of being connected by the flange 2 to a first pipe, and a tubular piece 3 capable of being connected by the flange 4 to a second pipe. This tubular piece 3 is coaxial with the cuplike piece 1 and is arranged partially inside it. Two flexible spherical rings 5 and 6, called below respectively the flexible abutment and the seal, are arranged between the tubular piece 3 and the cuplike piece 1.

The cup-shaped piece 1 is pierced axially by an orifice 7, the diameter which is equal to that of the inside diameter of the pipes which are to be connected. The inside of the cup-shaped piece 1 has close to the orifice 7 a cylindrical recess 8 in which a spherical annular shell 9 is placed, which shell 9 is integral with the convex face of the seal 6. The concave face of this seal 6 is integral with the spherical outer face 11 of an annular mounting 10, the internal side surface 12 of which defines a passage which is coaxial with the tubular piece 3 and the diameter of which is larger than that of the orifice 7. The annular mounting 10 bears on one edge of it a collar 13, the role of which will be made clear later.

An opening 14 of the cuplike piece 1 receives a flange 15, the upper surface 16 of which is spherical (with its center at 0) and which protrudes above the annular edge of opening 14. At least one portion of the inner surface 17 of flange 15 is conical. This flange 15 is fixed along its bottom surface 24 at the opening 14 by means known in themselves such as bolts 18. The spherical upper surface 16 of the flange 15 cooperates with a spherical collar 19 integral with the tubular piece 3. These two pieces flange 15 and collar 19, form a spherical bearing enabling movements of oscillation of the tubular piece 3 in the cuplike piece 1, and avoiding relative movements of the tubular piece 3 and the cuplike piece 1 under forces of axial compression of the pipes.

One lower face 20 of the flange 15 is shaped and designed for receiving the mounting 21 of the flexible abutment 5. This mounting 21 is a body of revolution the cross-section of which has the shape of a right-angled triangle 25 having a concave hypothenuse. The mounting 21 abuts against the inner surface 26 of the opening 14. The dimensions and the curvature 23 of the body of revolution are equal to those of the spherical convex surface 22 of the flexible abutment 5. The same statement applies to the mounting 29 in the form of a body of revolution, the convex face 28 of which has dimensions and a curvature equal to those of the concave side 27 of the flexible abutment 5. The cylindrical side face 30 of the mounting 29 has a diameter which corresponds with the outer diameter 31 of the tubular piece 3 with which it cooperates by at least one threaded end portion 32. The annular face 33 of the mounting 29 bears means of attachment for the collar 13 of the annular mounting 10.

In accordance with the invention, the relative position of the several pieces forming the flexible joint and the shape of them have been chosen so that the center 0 of oscillation of the whole invention is located between the flexible spherical rings, called the flexible abutment 5 and the seal 6, in the plane defined by the free edge 49 of the shell 9. The center 0 is likewise the center of the radii which define the several spherical surfaces of the flexible abutment 5, of the seal 6 and of their mountings, as well as of the bearing formed by the flange 15 and the spherical collar 19.

Hence, the flexible spherical rings 5 and 6 lie on opposite sides of the plane containing the center 0 as previously defined, their concavity being turned towards the center 0. This arrangement enables a large swing to be obtained, of the tubular piece 3 with respect to the cuplike piece 1, the annular gap between these two pieces 1 and 3 being reduced practically to the bulk of the flexible spherical rings 5 and 6 both in height and in diameter.

The angle of inclination obtained by this arrangement is of the order of $\pm 10°$ with respect to the vertical, limited by the area of the inner surface 17 of the flange 15.

The elastic body of the flexible spherical rings 5 and 6 comprises a stack of layers of elastomer 34 and a stack of spherical metal rings 35 in the form of a spherical zone. The spherical metal rings 35 are obtained by machining steel blanks along a radius equal to the distance between the center 0 and the position of the ring 35 in the stack. Hence, each metal ring 35 exhibits a different radius of curvature but a constant thickness. The stack for seal 6 is obtained in a known manner by vulcanization of the assembly of metal rings 35 and layers of elastomer 34. In a similar manner, the stack for flexible abutment 5 is obtained by vulcanization of an assembly of metal rings 35A and layers of elastomer 34A. The layers of elastomer 34 and 34A are natural rubber, the outer faces of which, 5A and 5B for the flexible abutment and 6A for the seal, are covered over with a vulcanized layer of chlorinated rubber or any other elastomer resistant to hydrocarbons and to the marine environment. Thus, the edges of the metal rings 35 and the layers of elastomer 34 are sheltered from attack by the marine environment which may contain traces of hydrocarbons.

The inner surface of the seal 6 in contact with the drilling mud is covered over by vulcanization with a sleeve 36 of synthetic rubber resistant to abrasion, to the petroleum and chemical products and to the high temperature of the drilling mud which at this point may exceed 100° C.

The mountings 21 and 29 of the flexible abutment 5 and the mounting 10 of the seal 6 are likewise attached to the elastic bodies of these stacks by vulcanization.

This embodiment enables perfect flexibility of the joints where preserving in them high resistance to compression and to shear. However, their resistance to tensile forces is limited.

Such forces may appear in certain cases of momentary drift of the ship or of the floating drilling platform. The "riser" tube attached to the tubular piece 3 of the flexible joint undergoes an abrupt axial force directed downwards which has the effect of producing a compression of the pipe. Because of the position of the seal 6 with respect to the center 0' it is then subjected to tensile forces. The possibility of putting the flexible abutment 5 under tension, accompanied by putting the seal 6 under compression is eliminated by the spherical bearing consisting of the flange 15 and collar 19 which take up and transmit directly the forces of compression of the tubular piece 3 to the cup-shaped piece 1 without passing through the flexible spherical rings 5 and 6.

The spherical bearing, being immersed entirely in the marine environment and operating only episodically under load, will exhibit negligible wear with time and will not influence the flexibility of the whole invention.

The edges of the spherical collar 19 are chamfered at 48 in order to avoid their overhanging the outer profile of the cup-shaped piece 1.

The seal 6, the shape and structure of which have been designed in order to ensure solely the sealing between the drilling mud circulating inside the pipes and the outside marine environment which penetrates freely into the gap 47 in the cuplike piece 1 through the orifices 37, is perfectly protected from accidental compression by this spherical bearing. Without the bearing, the seal 6 would undergo under the action of a force of axial compression, an extrusion which would be prejudicial to its length of life. In fact, the seal 6 must withstand an internal pressure which in normal running may reach several hundred bars. These pressures are better controlled, in smaller areas which are subjected to them, and consequently the inside diameter of the seal 6 is the smallest possible. This diameter is imposed by the diameter of the free passage which has to be respected. The thickness of the seal 6 depends upon its diameter and the operational pressure. At equal pressures, the thickness of the seal is less and, thus, its diameter may be smaller.

The arrangement of the pieces 1 and 3 forming this flexible joint in accordance with the invention is such that the inside diameter of the seal 6 is practically equal to the diameter of the free passage in the pipe. In addition, the concentric layering of the stack forming the seal 6 confers upon it good behaviour towards the outside pressure in the case where the inside of the pipes might be at reduced pressure with respect to the environment. This pressure may exist, for example, in the case where the flexible joint is interposed between the "riser" tube and the wellhead BOP blow-out preventer stack, if the latter is lowered to a great depth with its valves closed, or, in the case where during the course of drilling under water, an influx of gas occurs which is small in amount but sufficient to lighten the column of mud by making an emulsion of the latter.

The passage through the seal 6 does not after deflection, exhibit any substantial irregularity upon which the drill tools or the protuberances on the train of rods can come and catch.

The inlets to the flexible joint are equipped in a known manner with wear rings 38 which are attached to the flange 2 in a known manner. The problem evoked above about the behaviour of the seal 6 at the very high temperature of the drilling muds is solved by circulation of water by thermosiphon in the gap 47 around the seal 6.

The cup-shaped piece 1 includes orifices 37 and 37A arranged and directed suitably, for example, along an upper ring and a lower ring, which orifices 37 and 37A have a double role: to avoid putting the cup-shaped piece 1 and the flexible abutment 5 under pressure in the event of leakage of the seal 6, and to allow the inlet and outlet of water through the gap 47. The water penetrates through the orifices 37A in the lower ring, is heated in contact with the shell 9 and in contact with the area of the outer face 6a of the seal 6, thus undergoing a loss in specific weight which makes it leave through the orifices 37 in the upper ring. Thus, a continuous circulation of water is established around the seal 6.

This circulation of water ensures effective cooling of the seal 6.

Assembly of the several pieces forming the flexible joint is effected in the following order:

the spherical collar 19 is introduced over the tubular piece 3 and comes to a stop against the annular collar 39 on the tubular piece 3;

the flange 15 is next put in position, then the seal 5, the mounting 21 of which comes to a stop against the flange 15 after screwing of the mounting 29 onto the threaded end portion 32 of the tubular piece 3; a toroidal seal 40 ensures sealing between the mounting 29 and the tubular piece, which are locked together by the needle screw 41;

the collar 13 of the annular mounting 10 of the seal 6 is bolted onto the mounting 29 of the seal 5 after the interposition of a toroidal seal 42.

The assembly thus formed is introduced into the cuplike piece 1 so that the annular portion 43 of the shell 9 enters the cylindrical recess 8 at the bottom of the cuplike piece 1 where sealing is ensured by a toroidal seal 44.

The height measured between the bearing surface 45 of the flange 15, which is provided in order to cooperate with the annular edge of the cylindrical opening 14 of the cuplike piece 1, and the bearing surface on the annular portion 43 of the spherical shell 9 of the seal 6, is greater than that measured between the bottom of the cylindrical recess 8 and the annular edge of the cylindrical opening 14 of the cuplike piece 1. When the tubular piece 3 is in place in the cuplike piece 1, the bearing surface 45 of the flange 15 and the annular edge of the cylindrical opening 14 of the cuplike piece 1 exhibit a clearance H, the height of which may be adjusted by the bolts 18 which are put into place through notches 46. Pulling the bolts 18 up tighter more or less enables the desired axial prestress to be applied to the flexible abutment 5 and the seal 6.

In one embodiment made in accordance with the description of the invention, the pipes to be connected have an approximate diameter of 527 mm (20¾") and the overall diameter of the cuplike piece 1 is 1219 mm (48"), hence, the ratio between the outer diameter and the useful passage through the joint is about 2.3, whereas the joints at present on the market exhibit a ratio of at least 3. The difference in pressure that the joint is capable of withstanding both from the inside towards the outside and the reverse is of the order of 300 bars (about 4250 p.s.i.).

The angle of oscillation is ±10° with respect to the vertical axis.

These embodiments of the present invention are considered to be illustrative only since other modifications will be readily discerned by those skilled in the pertinent technology. In any event, the scope of the invention is intended to be covered by both the letter and the spirit of the claims appended hereto.

We claim:

1. A flexible joint for connecting together a first pipe with a second pipe, comprising:

a cup-shaped piece having an upper annular edge forming an upper cylindrical opening and also having a lower flange forming a lower axial orifice for connection with the first pipe;

a tubular piece for connection with the second pipe, said tubular piece being coaxial with the cup-shaped piece and being arranged partly therein;

a first and a second flexible spherical ring, each including a stack of alternating layers of spherical metal rings and elastomers, arranged between the cup-shaped piece and the tubular piece on opposite sides of a center of oscillation, said first and second flexible spherical rings having their concave surfaces directed concentrically towards the center of oscillation;

first mounting means for connecting the first and second flexible spherical rings to the cup-shaped piece;

second mounting means, positioned between the first and second flexible spherical rings, for interconnecting said first and second flexible spherical rings together;

means for connecting the tubular piece to the second mounting means;

an upper flange being attached to the upper annular edge forming the upper cylindrical opening of the cup-shaped piece and having a spherical upper surface; and a spherical collar being supported by the tubular piece and having a spherical inner concave surface for riding in a complementary cooperating manner on the spherical upper surface of the upper flange above the upper annular edge forming the upper cylindrical opening of the cup-shaped piece;

whereby the tubular piece is able to oscillate at an angle of about ±10° with respect to its vertical axis.

2. The flexible joint, according to claim 1, wherein:
said first mounting means includes a body of revolution, positioned between the upper flange and the second flexible spherical ring, for spacing said upper flange and said second flexible spherical ring apart.

3. The flexible joint, according to claim 1, wherein:
said first mounting means includes a spherical annular shell means, positioned between the lower flange of the cup-shaped piece and the first flexible spherical ring, for spacing said lower flange of the cup-shaped piece and said first flexible spherical ring apart.

4. The flexible joint, according to claim 1, wherein:
said first and second flexible spherical rings are connected to the second mounting means by vulcanization.

5. The flexible joint, according to claim 1, wherein:
clearance is provided between the upper flange and the upper annular edge forming the upper cylindrical opening of the cup-shaped piece so that prestress applied to the flexible joint may be adjusted.

6. The flexible joint, according to claim 1, further comprising:
a sleeve means, made of protective material, for covering over the surface of the first flexible spherical ring in contact with external corrosive material.

7. The flexible joint, according to claim 6, wherein:
said protective material is an elastomer resistant to hydrocarbons and said external corrosive material is drilling mud.

8. The flexible joint, according to claim 1, further comprising:
orifice means, arranged in the cup-shaped piece, for allowing the circulation of water by thermosiphon in a gap inside said cup-shaped piece.

* * * * *